United States Patent
Lemoff et al.

(10) Patent No.: US 11,927,836 B2
(45) Date of Patent: Mar. 12, 2024

(54) FEMTOOPTICS WITH OPTICAL METASURFACES AND MICROSTRUCTURED BAFFLES

(71) Applicant: Tectus Corporation, Saratoga, CA (US)

(72) Inventors: Brian Elliot Lemoff, Morgan Hill, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 472 days.

(21) Appl. No.: 17/397,718

(22) Filed: Aug. 9, 2021

(65) Prior Publication Data

US 2022/0050308 A1 Feb. 17, 2022

Related U.S. Application Data

(60) Provisional application No. 63/064,355, filed on Aug. 11, 2020.

(51) Int. Cl.
*G02C 7/04* (2006.01)
*G02B 27/42* (2006.01)
*G02C 11/00* (2006.01)

(52) U.S. Cl.
CPC ......... *G02C 7/049* (2013.01); *G02B 27/4205* (2013.01); *G02C 11/10* (2013.01)

(58) Field of Classification Search
CPC .......... G02C 7/049; G02C 11/10; G02C 7/04; G02B 27/4205; G02B 1/002
See application file for complete search history.

(56) References Cited

U.S. PATENT DOCUMENTS

| | | | | |
|---|---|---|---|---|
| 5,638,219 A | * | 6/1997 | Medina Puerta | G02B 17/004 359/729 |
| 8,134,778 B2 | * | 3/2012 | Guyer | G02B 27/0938 359/399 |
| 11,150,135 B1 | * | 10/2021 | Sorbel | G01N 21/4785 |
| 2011/0176205 A1 | * | 7/2011 | Shaw | G02B 17/0652 359/399 |
| 2019/0178714 A1 | * | 6/2019 | Faraji-Dana | G02B 5/1847 |
| 2020/0301119 A1 | * | 9/2020 | Lemoff | G02B 17/086 |
| 2020/0348176 A1 | * | 11/2020 | Faraji-Dana | G01J 3/1804 |

OTHER PUBLICATIONS

The advantages of metalenses over diffractive lenses, Engelberg et al., Nature Communications, (2020) 11:1991 | https://doi.org/10.1038/s41467-020-15972-9.

* cited by examiner

*Primary Examiner* — Collin X Beatty
(74) *Attorney, Agent, or Firm* — Fenwick & West LLP

(57) ABSTRACT

Small optics (femtooptics) may be made with optical metasurfaces or diffractive surfaces. Baffles may be formed in the femtooptics with through-glass-via techniques or a variety of etching strategies. Femtooptics may in addition be made using wafer stacking techniques. Variations and combinations of these approaches lead to femtooptics manufacturable in vast quantities by semiconductor wafer processing techniques, also referred to as wafer level optics.

20 Claims, 12 Drawing Sheets

FEMTOOPTICS WITH OPTICAL METASURFACES AND MICROSTRUCTURED BAFFLES

CROSS-REFERENCE TO RELATED APPLICATION(S)

This application claims priority under 35 U.S.C. § 119(e) to U.S. Provisional Patent Application Serial No. 63/064,355, "Femtooptics with metasurfaces and microstructured baffles," filed Aug. 11, 2020. The subject matter of all of the foregoing is incorporated herein by reference in its entirety.

BACKGROUND

1. Technical Field

This disclosure relates generally to small optics (femtooptics), for example as may be used in projectors and imagers contained in contact lenses.

2. Description of Related Art

A femtoprojector is a small video projector, for example small enough to fit inside a contact lens. Some femtoprojectors may fit within a 2 mm by 2 mm by 2 mm volume, for example. A femtoprojector includes an image source, such as an ultra-dense LED array, and an optical system. When a person wears a contact lens containing a femtoprojector, the femtoprojector projects images directly onto the person's retina. The person has the sensation of seeing objects that do not exist in the real world. A contact lens containing a femtoprojector may therefore be part of an augmented reality system.

A femtoimager is a small video imager, for example small enough to fit inside a contact lens. When mounted in a contact lens, the entrance aperture of a femtoimager may face outward to capture images of the world, or inward to capture images of the fundus. A femtoimager includes an optical system and an image sensor, such as a photodiode array.

The term "femtooptics" or "femtooptical system" may apply to the optical system found in femtoprojectors and femtoimagers. Because of the small size, the design and manufacture of femtooptics is challenging.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Some femtooptics designs incorporate curved mirrors formed on the ends of a solid, cylindrical, transparent substrate such as optical plastic or glass. The mirrors may be created by coating curved surfaces with a reflective metal such as silver or aluminum, or by growing alternating layers of dielectric materials such as MgF, $SiO_2$, $Ta_2O_5$, ZnS or $TiO_2$ to make a Bragg mirror. Femtooptics with curved mirrors may be manufactured by diamond turning a substrate on an ultra-precision lathe. Alternatively, femtooptics may be molded using molds that have themselves been created from diamond turned master parts. High precision is required for both the overall dimensions of femtooptics and the finish of their optical surfaces.

As described in more detail below, femtooptics may be made with optical metasurfaces or diffractive surfaces. Baffles may be formed in the femtooptics with through-glass-via techniques or a variety of etching strategies. Femtooptics may in addition be made using wafer stacking techniques. Variations and combinations of these approaches lead to femtooptics manufacturable in vast quantities by semiconductor wafer processing techniques, also referred to as wafer level optics.

Optical metasurfaces and diffractive surfaces are macroscopically flat structures that reflect or refract light. Here, "macroscopically flat" means approximately planar to within a few wavelengths or less, or even to less than a wavelength. Optical metasurfaces and diffractive surfaces include periodic and quasiperiodic structures. Diffractive surfaces have structures with periods greater than the wavelength of light while metasurfaces have structures with periods less than the wavelength of light. When a metasurface is transmissive, it may be referred to as a metalens. When it is reflective, it may be referred to as a metamirror. Metasurfaces may incorporate nano-rod truncated waveguides, nano-fin geometrical phase elements, or nano-disk structures, as examples.

Examples of diffractive surfaces include Fresnel lenses and binary optics. Binary optics is a surface-relief optics technology based on VLSI fabrication techniques, such as photolithography and etching.

The following examples first describe example femtooptics for contact lens-based femtoprojectors using optical metasurfaces. It should be understood that the principles illustrated below also apply to femtooptics for femtoimagers, to applications that are not contact lens based, and to diffractive surfaces.

Figure 1:
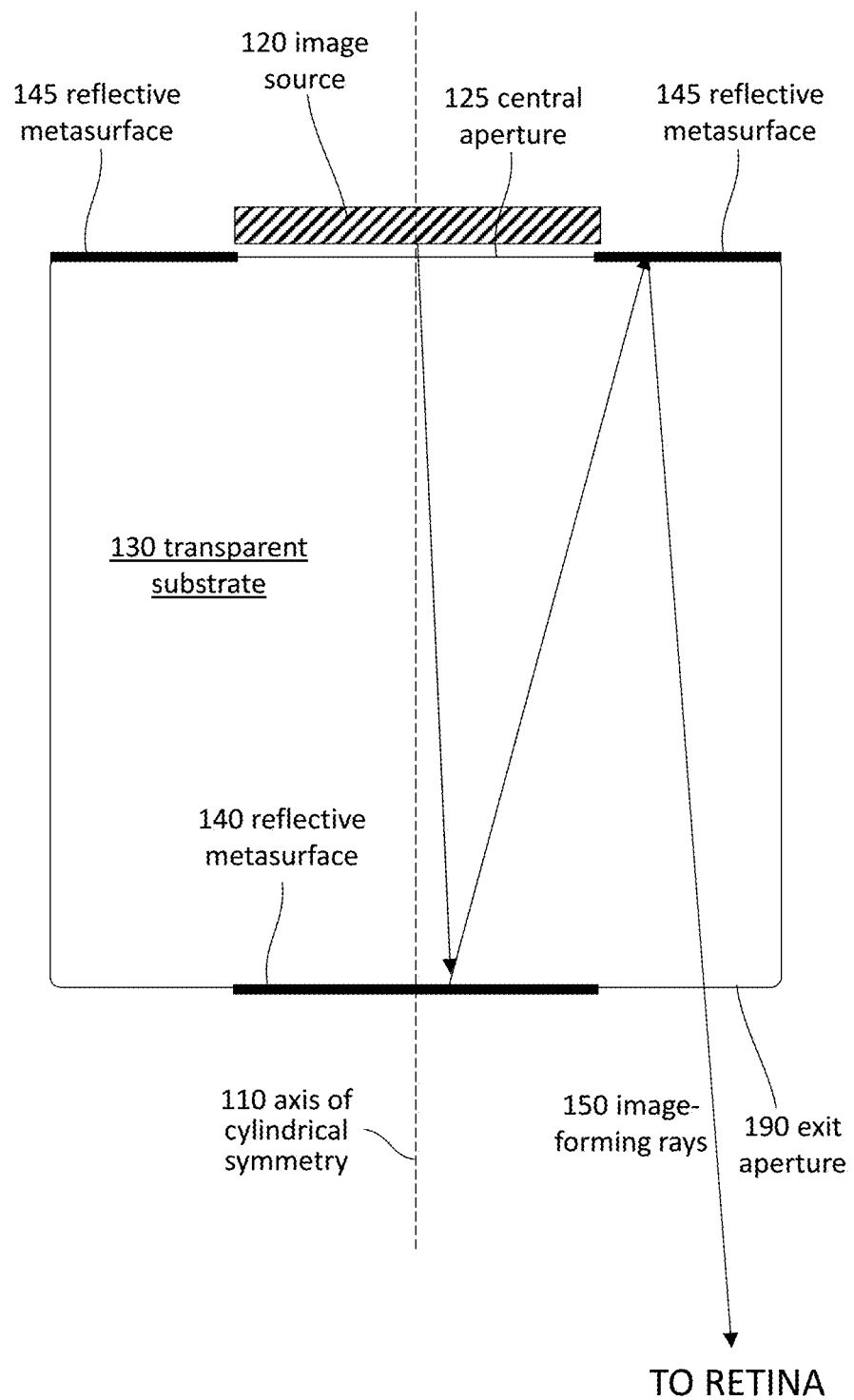
FIG. 1 shows a femtooptical system with flat metasurface reflectors.

FIG. 1 shows a femtoprojector using a femtooptical system with flat metasurface reflectors. FIG. 1 is a cross-sectional view of a cylindrical optical structure. The axis 110 of cylindrical symmetry is shown in FIG. 1, but is not shown in the other figures. The overall size of the femtooptical system is usually less than 1 mm along the symmetry axis and less than 1 mm in diameter, which is small enough to fit inside a contact lens worn on a person's eyeball. The image source 120 may be an ultra-dense GaN LED array bonded to a CMOS driver backplane. Pixels in the LED array may be arranged in a rectangular or hexagonal lattice with periodicity less than 2 um.

In FIG. 1 the image source 120 is positioned close to a transparent substrate 130 which may be made from glass, plastic or another solid, transparent material. Light travels from the image source 120 and is reflected by a first optical metasurface 140 formed on the opposite surface of the substrate. This reflective metasurface 140 functions like a convex mirror. It reflects light toward a second reflective optical metasurface 145 formed as an annular ring with a central opening to accommodate rays from the image source 120. The second metasurface 145 functions like a concave mirror. For convenience, metasurface 145 may be referred to as the primary reflector and metasurface 140 as the secondary reflector, consistent with the naming of reflectors in a Cassegrain telescope. The image source 120 is then located on the primary side of the substrate 130, and the image is projected to the retina which is located on the secondary side of the substrate 130.

The femtooptical system is an optical imaging system and images light from one conjugate (the image source 120) onto another conjugate (the retina of a person wearing a contact lens containing the femtooptical system). Image-forming rays 150 propagate from the first conjugate (image source 120) through a central opening 125 to the reflective metasurface 140 to the reflective metasurface 145 and then exit through the exit aperture 190 to the second conjugate (the user's retina).

FIG. 1 shows a femtoprojector, so the image-forming rays propagate in a forward direction along the path described. For femtoimagers, the image-forming rays may propagate in a backward direction along the same path, the image source is replaced by an image sensor, and the retina is replaced by the object of interest. In addition, diffractive surfaces may be substituted for one or more optical metasurfaces if a diffractive surface with the desired optical properties is available.

In FIG. 1 the reflective metasurfaces 140, 145 take the place of curved mirrors. As a result, the substrate in FIG. 1 may be cylindrical with two opposing flat ends, and is therefore simpler to manufacture than a system with curved ends. In fact, the reflective metasurfaces may be formed on the opposing flat surfaces of the substrate while the substrate is part of a large glass or plastic wafer containing many thousands or even millions of similar femtooptics substrates. The substrates may be separated from the wafer into individual substrates (e.g. by laser dicing) after the optical metasurfaces are formed. If the wafer is diced along straight cuts, the resulting individual substrates will have a square, rectangular or other polygon cross-section, rather than having a circular cross-section.

Figure 2:
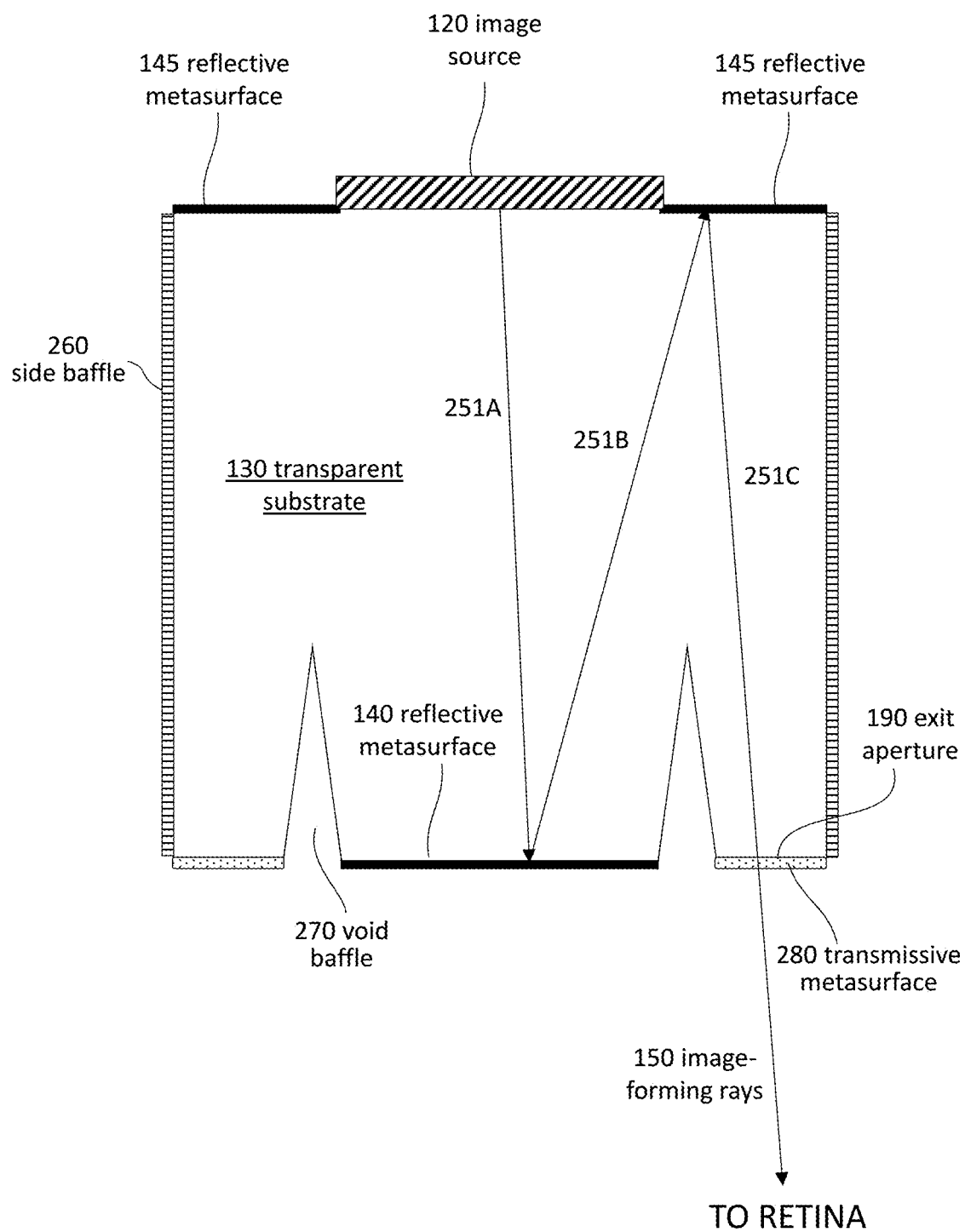
FIG. 2 shows a femtooptical system with void baffles and absorptive side baffles.

FIG. 2 shows a femtooptical system with a baffle system. Femtooptics may incorporate different types of light absorbing or blocking structures. These baffles improve image contrast by preventing stray light rays from exiting the substrate and reaching either the retina (in contact lens femtoprojectors) or the image sensor (in femtoimagers). Absorbers may include conventional black coatings or advanced materials such as vertically aligned nanotube arrays (e.g. Vantablack, Surrey NanoSystems, UK). Baffles and blocking structures may be formed by grooves, cavities or other structures created inside the substrate during manufacture.

Generally, the image forming rays 150 may be grouped into the following bundles: a bundle 251A of rays between the central opening and reflective surface 140, a bundle 251B of rays between the two reflective surfaces 140, 145, and a bundle 251C of rays between the reflective surface 145 and the exit surface 190. Baffles may then be positioned at the following locations: between bundles 251A and 251B, between bundles 251B and 251C, and to the outside of bundle 251C. Baffles may be positioned in the volume between the two flat surfaces or may be formed on the surfaces themselves.

For femtoprojectors, the baffles between bundles 251A and 251B may be referred to as source baffles, the baffles between bundles 251B and 251C as exit baffles, and the baffles to the outside of bundle 251C as side baffles. For femtoimagers, the baffles between bundles 251A and 251B may be referred to as sensor baffles, the baffles between bundles 251B and 251C as entrance baffles, and the baffles to the outside of bundle 251C as side baffles. More generically, the baffles between bundles 251A and 251B may be referred to as primary baffles, and the baffles between bundles 251B and 251C as secondary baffles.

The system of FIG. 2 is similar to that of FIG. 1. However the femtooptics in FIG. 2 also has absorptive coatings on the sidewall (side baffle 260) and void baffles 270 in the volume between bundles 251B and 251C. Void baffles 270 may be created, for example, by through-glass-via techniques.

The absorptive coating 260 on the sidewall (remember that the sidewall may be the curved surface of a cylinder, or roughly cylindrical object) may be a conventional black coating or an advanced black coating such as Vantablack mentioned above. In the design of the femtooptics, image-forming rays do not strike the sidewall, so any rays incident upon it are stray rays and are attenuated.

The void baffle 270, which is an annular cavity extending into the volume of the substrate 130, prevents light rays from propagating directly from the image source 120 to the exit aperture 190 without being reflected by the first and second metasurfaces 140, 145. In the design shown in the figure, some, but not all of these rays are blocked by the void 270. Different shaped voids 270 may be created to block more rays. The void 270 may also be coated with an absorptive material.

Voids or grooves may be created in different techniques, including dry etching, wet etching, wafer molding, mechanical drilling or laser drilling. Techniques for creating through-glass vias by laser drilling have been developed in the semiconductor industry and are available for high volume manufacturing. A "blind" via is a via that does not go all the way through a wafer or layer of a wafer. Voids or grooves may be produced using techniques for manufacturing blind vias.

The femtooptics in FIG. 2 also has a transmissive optical metasurface 280 at the exit aperture. Interfaces may be formed at the entrance or exit apertures of the substrate or between different material layers in the substrate. Both femtoprojector and femtoimager femtooptics may use reflective metasurfaces to focus light. However, the reflectors may be assisted by these interfaces as well. The transmissive metasurface 280 in FIG. 2 replaces a conventional refractive interface at the exit aperture of the femtooptical system. This makes it possible to manufacture the femtooptics with wafer optics techniques. It may work in conjunction with the reflective metasurfaces to focus light from the image source onto the retina and also to correct for aberrations.

Figure 3:
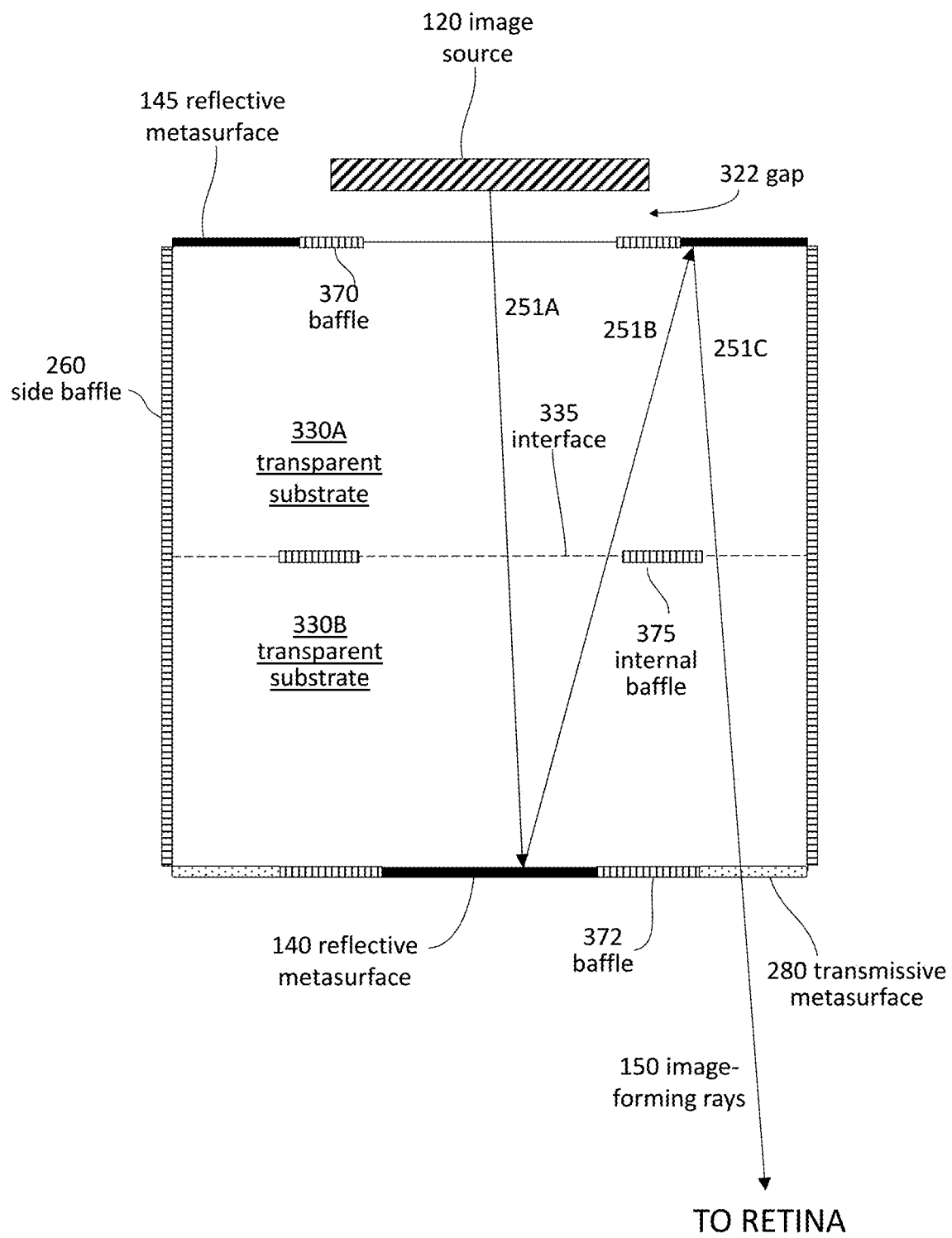
FIG. 3 shows a femtooptical system with internal baffles.

FIG. 3 introduces additional variations. FIG. 3 shows a femtooptical system with internal baffles. The system illustrated in FIG. 3 is similar to that of FIGS. 1 and 2. However, in FIG. 3, the image source 120 is separated from the substrate 330 by a gap 322, baffles 370, 372 in the form of absorptive coatings are added in annular rings on the flat end surfaces of the substrate, and the substrate is a formed in two parts 330A, 330B, by bonding two flat substrates together sandwiching an annular internal baffle 375 between them.

These variations shown in FIG. 3 may be found in different femtooptical designs depending on specific requirements. They may be combined with other variations illustrated in the other figures.

As shown in FIG. 3, the image source 120 may be separated from the substrate by a significant gap 322. The gap 322, which may be empty or filled with a transparent material, may be designed to suppress stray rays from the image source and prevent them from propagating to the retina.

In addition to the reflective metasurfaces 140, 145 and transmissive metasurface 280, which image rays between conjugates, annular absorptive coatings 370, 372 applied on the flat ends of the substrate are shown in FIG. 3. These coatings also serve to absorb stray rays. An internal baffle 375 further ensures that only image rays, and not stray rays, are focused on the retina. The internal baffle 375 may be created as an annular ring of absorptive material formed on the surface of one of the two parts 330A,B of the transparent substrate. When the two parts 330A,B are bonded together, the internal baffle 375 is sandwiched between them. In the figure, the internal baffle 375 is sandwiched between parts 330A and 330B of the transparent substrate. Forming baffles this way on flat surfaces may be simpler to manufacture than forming grooves or voids.

In this example, baffle 370 is positioned between ray bundles 251A and 251B, baffles 372 and 375 are positioned between ray bundles 251B and 251C, and side baffle 260 is positioned outside of ray bundle 251C. Baffles 372, 375 play a similar role as the void baffle 270 in FIG. 2, but may be simpler to manufacture.

Figure 4:
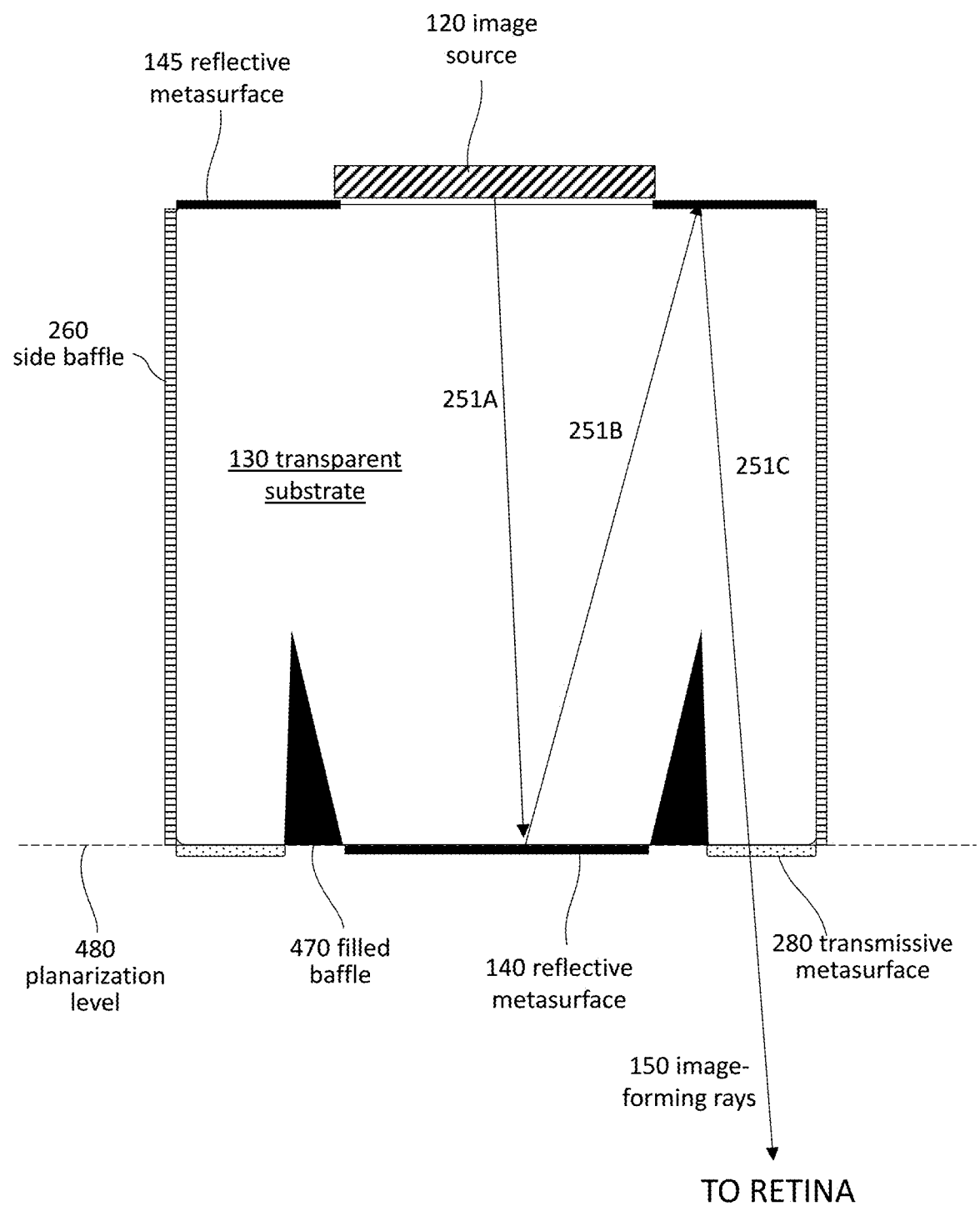
FIG. 4 shows a femtooptical system with filled baffles.

FIG. 4 shows a femtooptical system with filled baffles. FIG. 4 is similar to FIGS. 1-3, especially FIG. 2. However in FIG. 4, the annular groove baffle 470 is filled with material. The groove is also tilted, meaning the bisector of the angle formed by its sidewalls, as seen in this cross-sectional view is not parallel to the symmetry axis of the femtooptical system. Said another way, the bisector of the angle formed by the sidewalls is not perpendicular to the flat output surface of the femtooptical system. The groove in FIG. 2 is not tilted; it is parallel to the symmetry axis and perpendicular to the flat ends.

The annular groove baffle 470 in FIG. 4 may be formed before metasurface 140 is created on the flat end of the substrate. Metasurfaces may be formed by material deposition, photolithography and etching. To perform these processes accurately at the size scales needed for metasurface structures, it is helpful if not required to start on a smooth surface. Thus, after the annular baffle groove 470 (tilted or not) is filled with material, the end of the femtooptical system may be planarized by chemical mechanical polishing or another planarization method. The flat surface (planarization level 480) thus created is appropriate for subsequent processing steps during which metasurface 140, involving submicron features, is formed.

Figure 5:
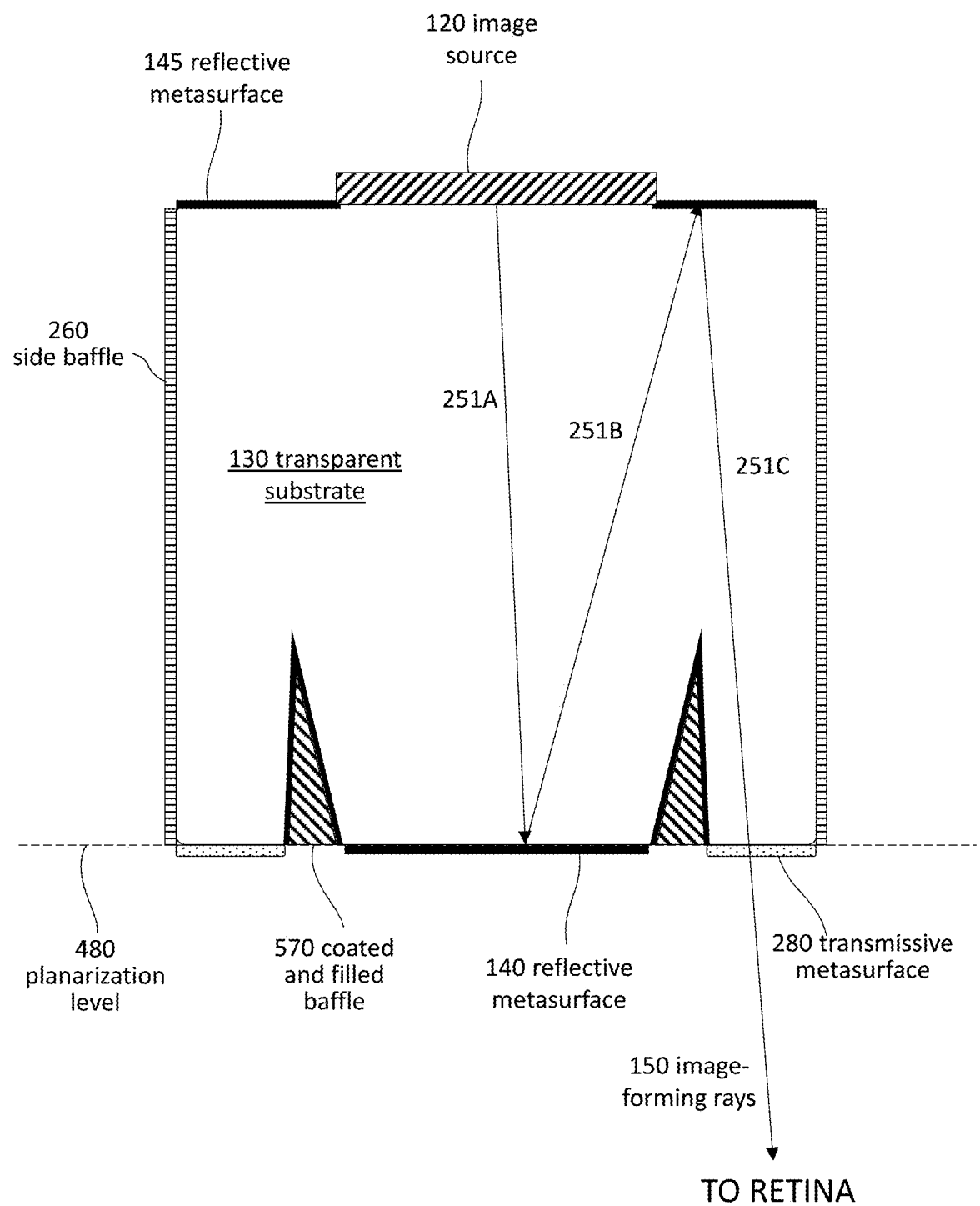
FIG. 5 shows a femtooptical system with coated, filled baffles.

FIG. 5 shows a femtooptical system with coated, filled baffles 570. The difference between these baffles and the baffles of FIG. 4 is that the material coating the surface of the annular groove and the material filling the groove are not the same. One material may be highly light absorbent but not suitable as a fill material, while another material may be good for filling, but not for light absorption. So in this case the materials are applied according to their strengths in their differing roles.

In the figures, some baffles are illustrated as formed by grooves in the flat surface of a femtooptical system opposite the light source or light sensor. However, baffles may also (or instead) be formed by grooves in the flat surface adjacent to the light source or light sensor, the same flat surface that the light source or sensor abuts in some designs.

Figure 6:
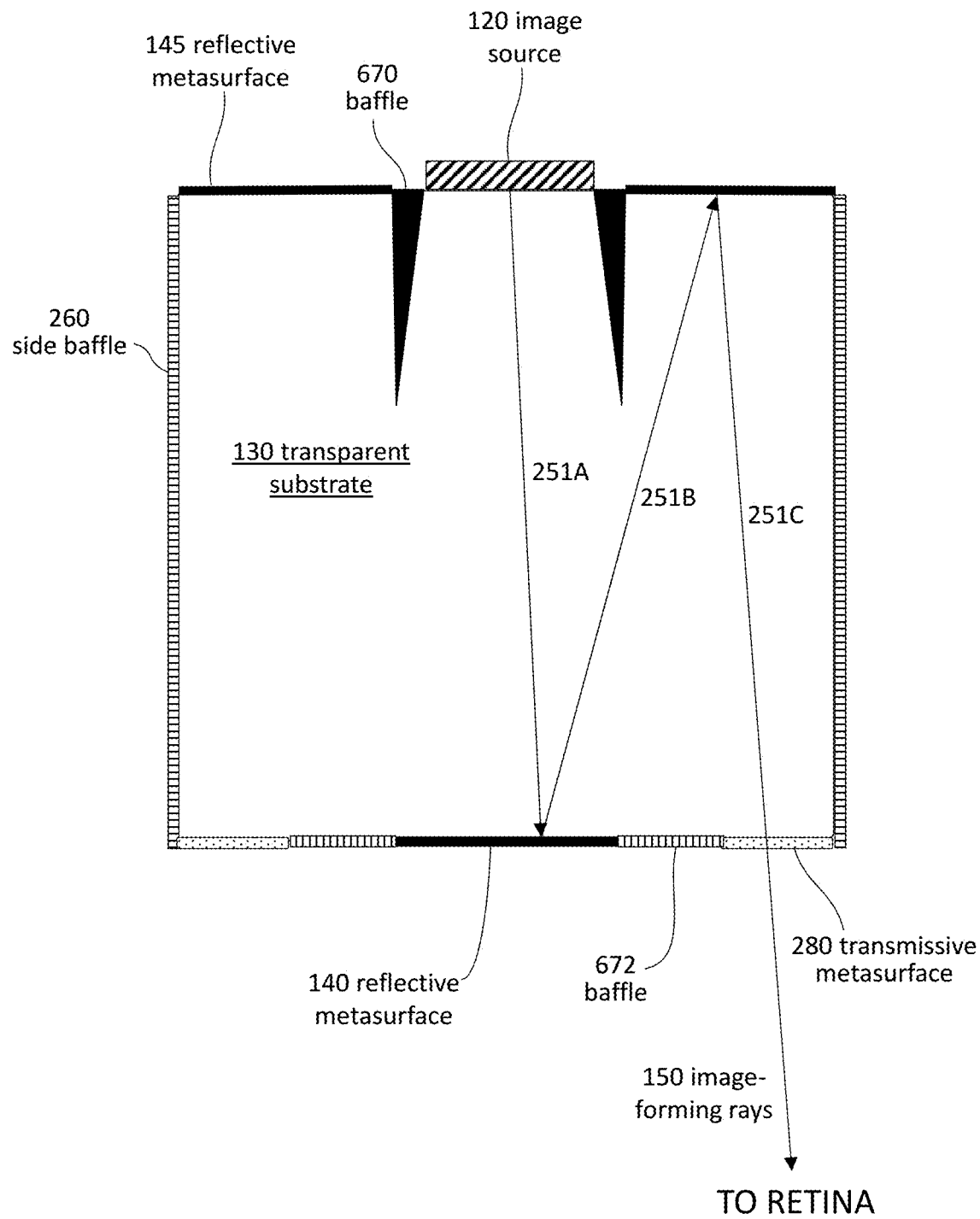
FIG. 6 shows another femtooptical system with source baffles.

FIG. 6 shows a femtooptical system with primary baffles 670. The primary baffle 670 may have a rectangular or other shape cross-section to match the shape of the image source 120. The absorbing tube 670 blocks rays from the image source from exiting the system without first being reflected by the metasurface 140. It reduces the divergence of rays produced by the image source 120. If the divergence is sufficiently reduced, then side baffles 260 may not be required.

Figure 7:
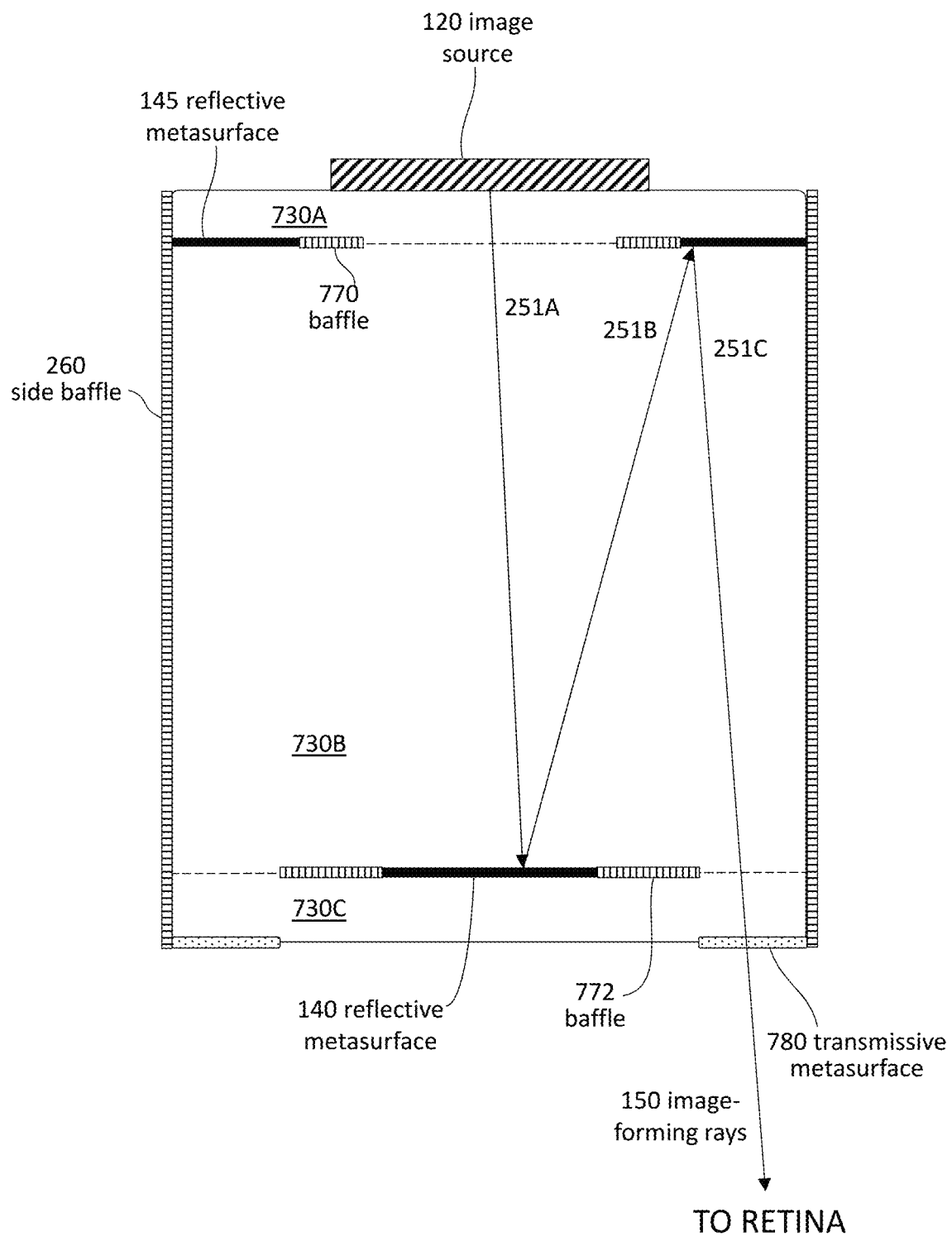
FIG. 7 shows a femtooptical system with internal reflective metasurfaces.

FIG. 7 shows a femtooptical system with internal metasurfaces. In this example, the optical substrate has three parts 730A, 730B, 730C. One reflective metasurface 145 is located on the flat interface between parts 730A and 730B. The other reflective metasurface 140 is located on the flat interface between parts 730B and 730C. Baffles 770, 772 are also positioned on these flat interfaces. FIG. 7 shows a transmissive metasurface 780 on the outside surface of the substrate 730C. The different parts 730A-730C may have different indices of refraction, as is also the case for the two parts 330A, 330B in FIG. 3.

Other arrangements of metasurfaces and baffles is also possible when the transparent substrate is constructed from multiple parts. The reflective metasurfaces 140, 145 may be located on any of the surfaces of the parts, which after assembly may correspond to internal interfaces or exterior surfaces of the assembled substrate. The same is true for baffles. Surface baffles may be located on any of the surfaces of the parts. Three-dimensional baffles, such as voids, cavities and filled structures, may extend from any of the surfaces of the parts.

Figure 8:
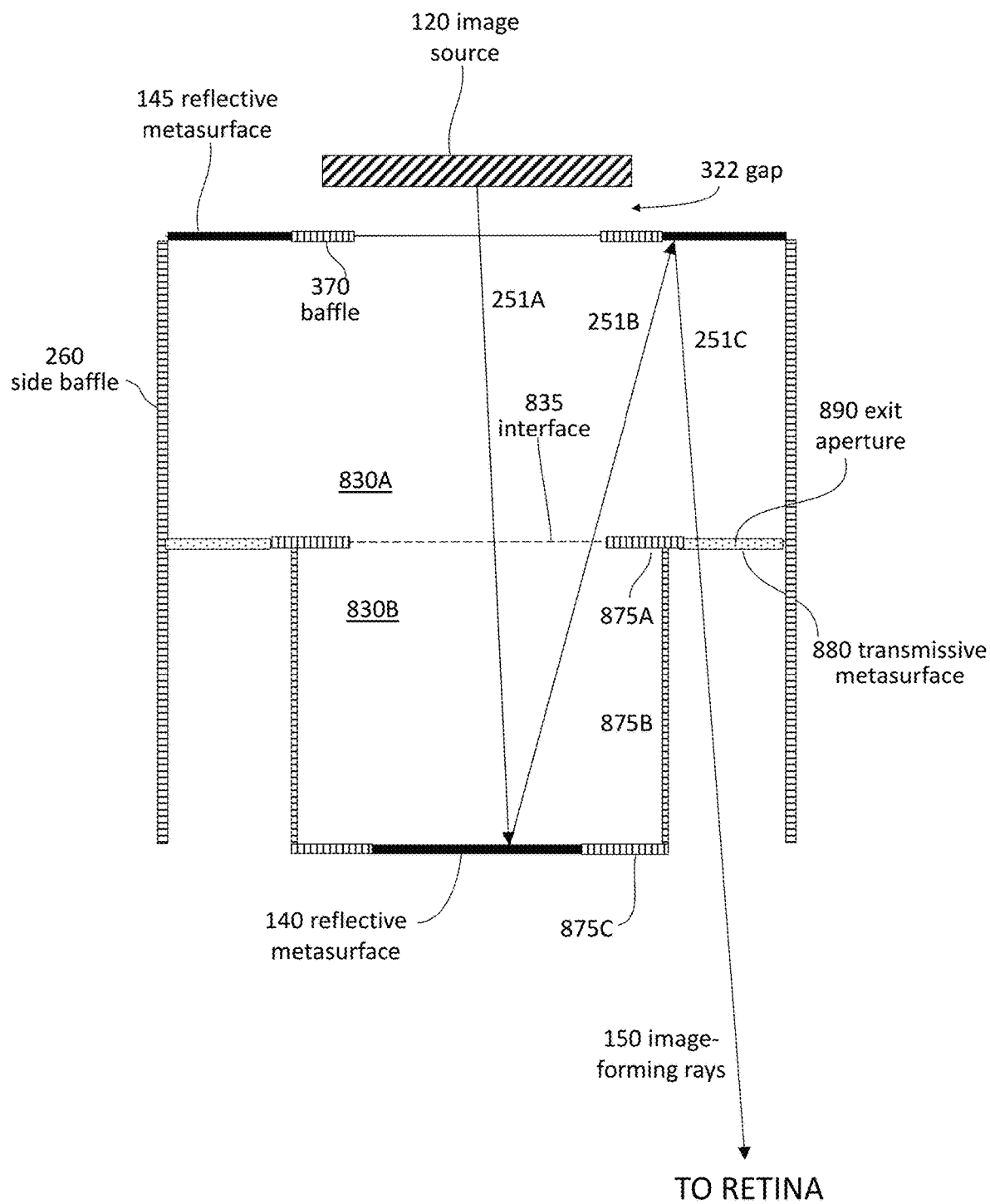
FIG. 8 shows a femtooptical system using a multi-part substrate.

FIG. 8 shows a femtooptical system in which the transparent substrate is constructed from two parts 830A, 830B of different sizes. Part 830B is smaller in cross-sectional area than part 830A. This allows placement of the exit window 890, with or without metasurface 880 at a different location than the two metasurface reflectors 140, 145. The baffle 875 is constructed in three parts. Surface baffle 875A is on the flat interface 835 between the two parts. Surface baffle 875C is on the exterior flat surface of the substrate. Baffle component 875B is on the sidewall of part 830B.

The use of optical metasurfaces allows the use of wafer level optics manufacturing techniques. Rather than individually shaping each femtooptic, a wafer containing an array of femtooptics may be manufactured. The wafer is then diced into individual femtooptics. In such a case, the femtooptics may be arranged on the wafer in a rectangular or hexagonal array. Dicing preferably is along straight lines. The resulting singulated femtooptics may have polygon cross sections as a result of the dicing process. However, many optical imaging systems are optically cylindrical with a central optical axis. Masking (baffles) may be used to mask off surfaces of the polygonal substrate that are outside the optical area of interest.

Figure 9:
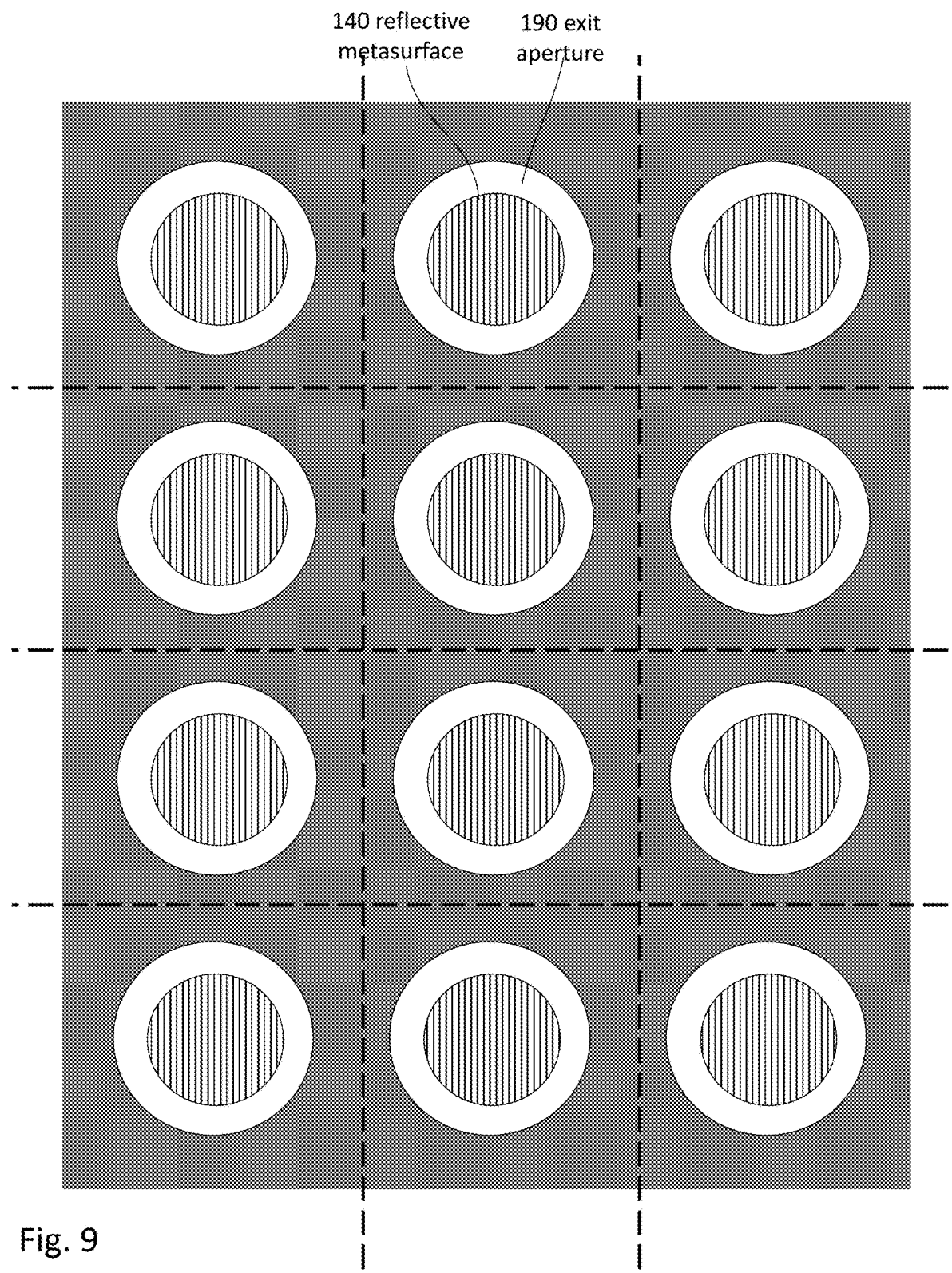
FIG. 9 shows a plan view of wafer level optics.

FIG. 9 is a plan view of a solid transparent wafer containing an array of femtooptics. Referring to FIG. 1, FIG. 9 is a view of the surface on the secondary side of the femtooptics. FIG. 9 shows a 4×3 array of femtooptics. Each center hatched circle is the secondary metasurface 140 of a different femtooptic. The white annulus is the exit window 190 for the image-forming rays. Primary metasurface 145 is on the opposite surface of the wafer. The gray area outside the white annulus is masking. The solid transparent wafer may be diced along the dashed lines, resulting in individual dies (substrates) that are physically square in cross-section. In this example, the substrate cross-section is larger than the area used for the femtooptic, so some of the surface area is masked.

Alternatively, the subtrate cross-section could be approximately the same or smaller than the area used for the femtooptic. For example, the individual dies may be diced to have a multi-sided polygon cross section that approximates a cylindrical femtooptic.

One application for femtooptics is femtoprojector optical systems contained in contact lenses. These systems are designed to project images from an image source that is inside a contact lens onto a user's retina. Femtoprojector optical systems are small enough to fit inside contact lenses.

Figure 10:
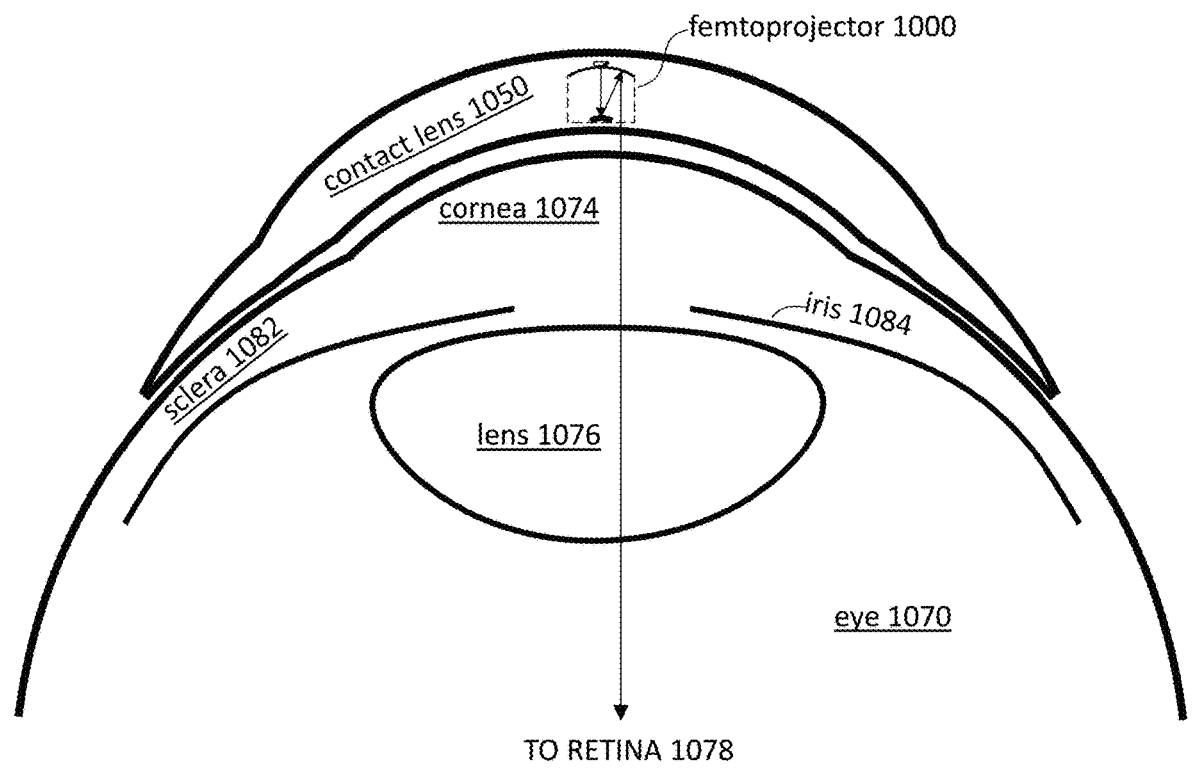
FIG. 10 shows a cross sectional view of an eye-mounted display containing a femtoprojector in a contact lens.

FIG. 10 shows a cross sectional view of an eye-mounted display containing a femtoprojector 1000 in a contact lens 1050. FIG. 10 shows an embodiment using a scleral contact lens which rests on the wearer's sclera 1082, but the contact lens does not have to be scleral. The aqueous of the eyeball is located between the cornea and the crystalline lens 1076 of the eye. The vitreous fills most of the eyeball 1070 including the volume between the intraocular lens 1076 and the retina 1078. The iris 1084 limits the aperture of the eye. The contact lens 1050 preferably has a thickness that is less than two mm, and the femtoprojector 1000 preferably fits in a 2 mm by 2 mm by 2 mm volume. The contact lens 1050 is comfortable to wear and maintains eye health by permitting oxygen to reach the cornea 1074.

Figure 11:
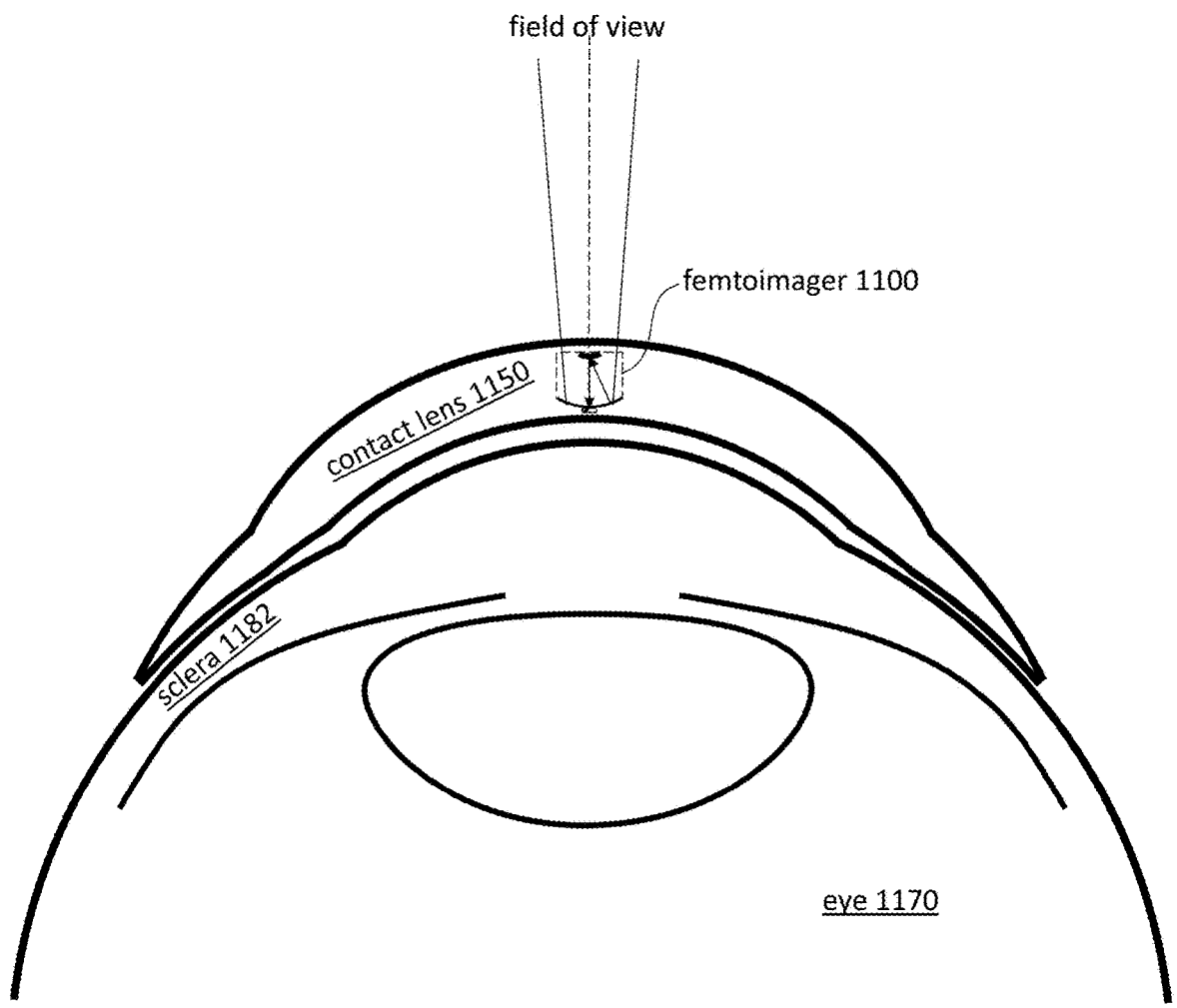
FIG. 11 shows a cross sectional view of a femtoimager in a contact lens.

Another application for femtooptics is femtoimager optical systems, which may also be contained in contact lenses. FIG. 11 shows a cross sectional view of a femtoimager 1100 in a contact lens 1150. This example also uses a scleral contact lens which rests on the wearer's sclera 1182. The femtoimager 1100 is facing outwards and may capture images within the natural field of view of the eye 1170.

Figure 12:
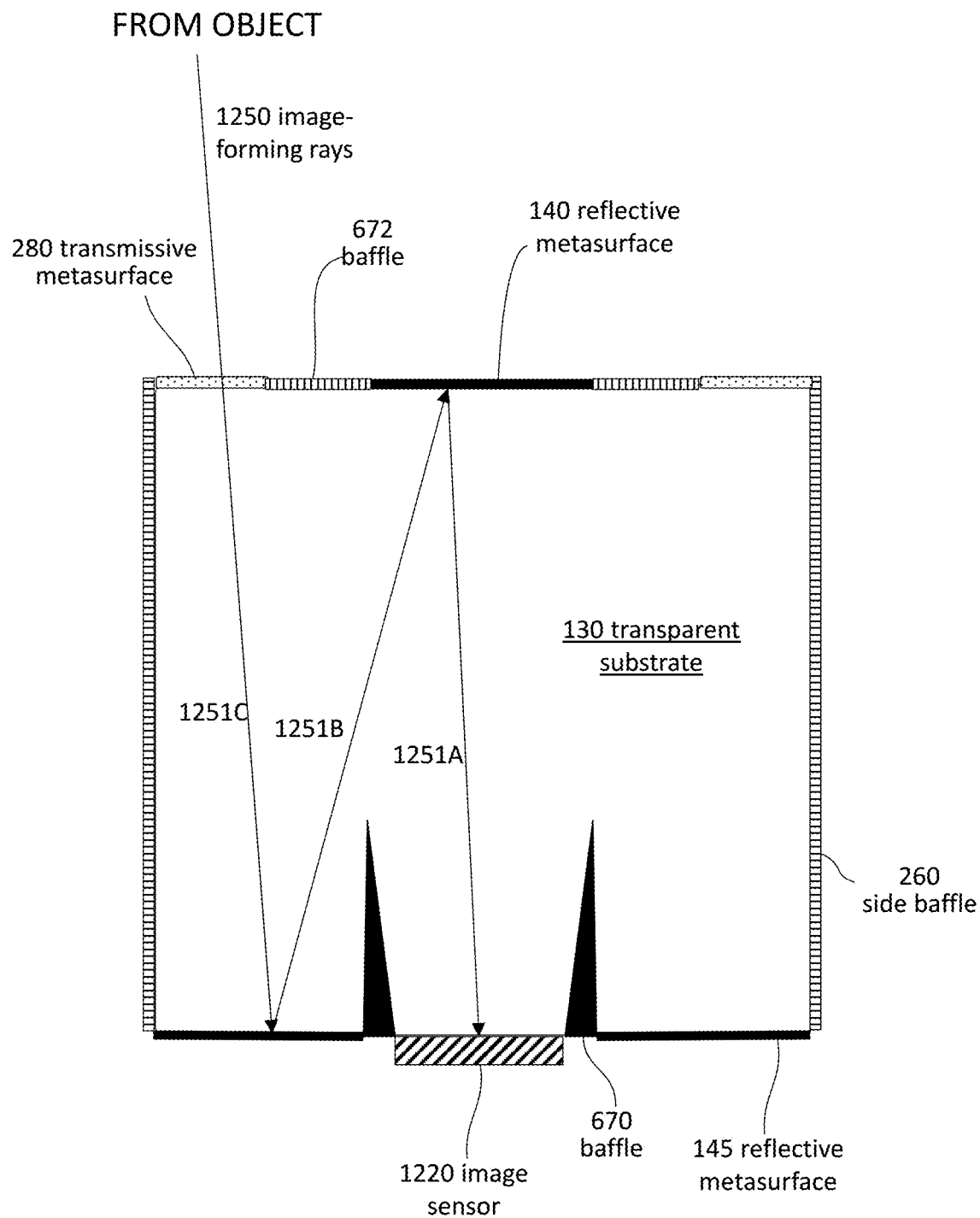
FIG. 12 shows a femtooptical system used in a femtoimager.

The above descriptions of femtoprojector optical systems also apply to femtoimager optical systems. For example, FIG. 12 shows the femtooptics of FIG. 6, but used in a femtoimager rather than a femtoprojector. The image-forming rays 1250 propagate in the reverse direction. The image source 120 in the above figures is replaced by an image sensor 1220, and the retina is replaced by an object at optical infinity (which may be the retina, if the femtoimager is facing inwards at the wearer's retina rather than facing outwards).

Femtooptics for femtoimagers are similar to, but not exactly the same as, femtooptics for femtoprojectors. Differences may exist in baffling schemes, aberration strategies and other subtleties of optical design. Some of the differences arise because the optical task is different. The display that a femtoprojector images onto the retina may contain pixels with arbitrary radiation patterns, for example, and baffles are designed to improve image contrast. On the other hand, an outward facing femtoimager images light rays originating at optical infinity onto a sensor array, so its baffling requirements are different. However, the principles and design choices described above with respect to femtoprojectors also apply to femtoimagers, including placement, arrangement and construction of reflective metasurfaces and baffles.

The following will be apparent from the above disclosure.

A substrate for a femtooptical system may be transparent. It may be made of glass or plastic for example. It may have one or two flat ends. It may be made from one wafer or from two or more wafers, bonded together to make a thicker wafer.

Internal baffles may be patterned on one or more wafers before bonding. Baffles may be made from voids created by through-glass-via laser etching techniques. Baffles may be made from other kinds of etching or drilling. Voids may be coated with absorptive material. Voids may be filled with absorptive or other material in preparation for planarization.

Reflective metasurfaces may be fabricated on either or both ends of the substrate. Refractive metasurfaces may be fabricated on one of the ends of the substrate. Diffractive surfaces may be substituted for metasurfaces. Metasurfaces or diffractive surfaces may be fabricated on planarized substrates.

Femtooptics may be separated from a wafer to form individual femtooptics. Absorptive coatings may be applied to exterior surfaces after singulation.

An image source or image detector may abut the femtooptical system or be separated from it.

A system may have all flat/meta surfaces or a mixture of flat/meta and conventional curved surface optics. The figures show example combinations of various features, but many other combinations are possible. For example, internal baffles and groove baffles may be found in one system, and groove baffles may be formed in either of the two flat surfaces of the system, or both.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An optical imaging system comprising:
    a solid transparent substrate having a first flat surface and a second opposing flat surface;
    a primary reflective region located on the first flat surface, the primary reflective region having a central opening;
    a secondary reflective region located on the second flat surface, wherein at least one of the primary and secondary reflective regions comprises an optical metasurface, the optical metasurface having structures that are smaller than a wavelength of image-forming rays for the optical imaging system;
    wherein image-forming rays are imaged between a first conjugate and a second conjugate; the first conjugate is located to a same side of the substrate as the first flat surface; the second conjugate is located to a same side of the substrate as the second flat surface;
    and the image-forming rays propagate from the first conjugate through the central opening to the secondary reflective region to the primary reflective region to the second conjugate, either along a forward direction or along a reverse direction; and at least one of (a) a primary baffle located between a first ray bundle and a second ray bundle, the first ray bundle comprising image-forming rays propagating between the central opening and the secondary reflective region, and the second ray bundle comprising image-forming rays propagating between the secondary reflective region and the primary reflective region; and (b) a secondary baffle located between the second ray bundle and a third ray bundle, the third ray bundle comprising image-forming rays propagating between the primary reflective region and the second flat surface.

2. The optical imaging system of claim 1 wherein the optical meta surface comprises at least one of nano-rod truncated waveguides, nano-fin geometrical phase elements, and nano-disk structures.

3. The optical imaging system of claim 1 wherein the optical metasurface comprises quasiperiodic structures that are smaller than the wavelength of image-forming rays.

4. The optical imaging system of claim 1 wherein each of the primary and secondary reflective regions comprises an optical metasurface.

5. The optical imaging system of claim 1 wherein at least one of the primary and secondary baffles comprises an absorptive material located on one of the flat surfaces.

6. The optical imaging system of claim 1 wherein at least one of the primary and secondary baffles is located in a volume between the first and second flat surfaces.

7. The optical imaging system of claim 6 wherein the at least one baffle comprises a cavity extending from one of the flat surfaces into the volume.

8. The optical imaging system of claim 7 wherein the cavity has an annular cross-section on the flat surface from which the cavity extends.

9. The optical imaging system of claim 1 further comprising:
a side baffle.

10. The optical imaging system of claim 1 further comprising:
an image source located at the first conjugate, wherein the image-forming rays propagate along the forward direction from the image source to the second conjugate; and
a baffle system that prevents stray rays produced by the image source from exiting the solid transparent substrate.

11. The optical imaging system of claim 1 further comprising:
an image sensor located at the first conjugate, wherein the image-forming rays propagate along the reverse direction from the second conjugate to the image sensor; and
a baffle system that prevents rays not from the second conjugate from exiting the optical transparent substrate through the central opening.

12. The optical imaging system of claim 1 wherein the optical imaging system has a central optical axis and is optically cylindrical, but the solid transparent substrate has a polygon cross section.

13. The optical imaging system of claim 1 wherein the solid transparent substrate comprises two parts with a flat interface between the two parts.

14. The optical imaging system of claim 13 further comprising:
a baffle located on the flat interface between the two parts.

15. The optical imaging system of claim 1 wherein the second conjugate is an infinite conjugate.

16. The optical imaging system of claim 1 wherein the solid transparent substrate is not larger than 2 mm×2 mm×2 mm.

17. The optical imaging system of claim 1 further comprising:
an array of one or more grooves that extend from one of the flat surfaces into the wafer, wherein each groove is located outside a central optical zone with image-forming rays.

18. An optical imaging system comprising:
a solid transparent substrate having a first flat surface and a second opposing flat surface, wherein the solid transparent substrate comprises two parts with a flat interface between the two parts;
a primary reflective region located on the first flat surface or on the flat interface, the primary reflective region having a central opening; and
a secondary reflective region located on the flat interface or on the second flat surface, wherein at least one of the primary and secondary reflective regions comprises an optical meta surface;
wherein image-forming rays are imaged between a first conjugate and a second conjugate; the first conjugate is located to a same side of the substrate as the first flat surface; the second conjugate is located to a same side of the substrate as the second flat surface; and the image-forming rays propagate from the first conjugate through the central opening to the secondary reflective region to the primary reflective region to the second conjugate, either a long a forward direction or along a reverse direction; and at least one of (a) a primary baffle located between a first ray bundle and a second ray bundle, the first ray bundle comprising image-forming rays propagating between the central opening and the secondary reflective region, and the second ray bundle comprising image-forming rays propagating between the secondary reflective region and the primary reflective region; and (b) a secondary baffle located between the second ray bundle and a third ray bundle, the third ray bundle comprising image-forming rays propagating between the primary reflective region and the second flat surface.

19. Wafer level optics comprising:
a solid transparent wafer having a first flat surface and a second opposing flat surface;
an array of primary reflective regions located on the first flat surface, each primary reflective region having a central opening; and
an array of corresponding secondary reflective regions located on the second flat surface, wherein at least one of the first and secondary reflective regions comprises optical metasurfaces;
wherein for each pair of corresponding primary and secondary reflective regions: image-forming rays are imaged between a first conjugate and a second conjugate; the first conjugate is located to a same side of the wafer as the first flat surface; the second conjugate is located to a same side of the wafer as the second flat surface; and the image-forming rays propagate from the first conjugate through the central opening to the secondary reflective region to the primary reflective region to the second conjugate, either along a forward direction or along a reverse direction; and at least one of (a) an array of primary baffles located between first ray bundles and second ray bundles, the first ray bundles comprising image-forming rays propagating between the central openings and the secondary reflective regions, and the second ray bundles comprising image-forming rays propagating between the secondary reflective regions and the primary reflective regions; and (b) an array of secondary baffles located between the second ray bundles and third ray bundles, the third ray bundles comprising image-forming rays propagating between the primary reflective regions and the second flat surfaces.

20. A method for manufacturing wafer level optics comprising:

forming an array of primary reflective regions on a first flat surface of a solid transparent wafer, each primary reflective region having a central opening;

forming an array of corresponding secondary reflective regions located on a second opposing flat surface of the solid transparent wafer, wherein at least one of the primary and secondary reflective regions comprises optical metasurfaces;

forming at least one of (a) an array of primary baffles located between first ray bundles and second ray bundles, the first ray bundles comprising image-forming rays propagating between the central openings and the secondary reflective regions, and the second ray bundles comprising image-forming rays propagating between the secondary reflective regions and the primary reflective regions; and (b) an array of secondary baffles located between the second ray bundles and third ray bundles, the third ray bundles comprising image-forming rays propagating between the primary reflective regions and the second flat surfaces; and dicing the solid transparent wafer into individual dies, each die containing a pair of corresponding primary and secondary reflective regions;

wherein for each pair of corresponding primary and secondary reflective regions: image-forming rays are imaged between a first conjugate and a second conjugate; the first conjugate is located to a same side of the wafer as the first flat surface; the second conjugate is located to a same side of the wafer as the second flat surface; and the image-forming rays propagate from the first conjugate through the central opening to the secondary reflective region to the primary reflective region to the second conjugate, either along a forward direction or along a reverse direction.

\* \* \* \* \*